US006295373B1

(12) United States Patent
Mahalanobis et al.

(10) Patent No.: US 6,295,373 B1
(45) Date of Patent: Sep. 25, 2001

(54) POLYNOMIAL FILTERS FOR HIGHER ORDER CORRELATION AND MULTI-INPUT INFORMATION FUSION

(75) Inventors: Abhijit Mahalanobis, Tuscon, AZ (US); B. V. K. Vijaya Kumar, Upper St. Claire, PA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/054,497

(22) Filed: Apr. 3, 1998

Related U.S. Application Data

(60) Provisional application No. 60/043,408, filed on Apr. 4, 1997.

(51) Int. Cl.[7] .............................. G06K 9/76; G06K 9/64; G06K 9/40
(52) U.S. Cl. ......................... 382/210; 382/260; 382/279
(58) Field of Search .................................. 382/209, 210, 382/278, 279, 308

(56) References Cited

U.S. PATENT DOCUMENTS

| | | | |
|---|---|---|---|
| 4,578,676 | * 3/1986 | Harrison, Jr. | .......................... 342/89 |
| 5,060,279 | 10/1991 | Crawford et al. | . |
| 5,109,431 | 4/1992 | Nishiya et al. | . |
| 5,341,142 | * 8/1994 | Reis et al. | .............................. 342/64 |
| 5,774,491 | 6/1998 | Black et al. | . |
| 5,960,097 | * 9/1999 | Pfeiffer et al. | ........................ 382/103 |

OTHER PUBLICATIONS

Lin et al, Fast FIR Filtering Algorithms Based on Overlapped Block Structure; IEEE Paper ISBN: 0–7803–1281, vol. 1, pp. 363–366, May 1993.*

Ravichandran et al, "Advanced In–Plane Rotation–Invariant Correlation Filters"; IEEE Paper ISBN: 0162–8828, pp. 415–420, Apr. 1994.*

Won et al, "Morphological Shared–Weight Neural Network for Pattern Classification and Automatic Target Detection", IEEE Conference on Neural Networks; ISBN: 0–7803–2768–3, vol. 4, pp. 21342138, Nov. 1995.*

Oguz Sunay et al, An Orthogonal Approach to the Spatial–Domain Design of 2–D Recursive and Nonrecursive Nonlinear Filters, IEEE Transaction on Circuits and Systems, ISSN: 1057–7130, vol. 41, Issue 10, pp. 669–677, Oct. 1994.*

Chiang et al, "A Hybrid Feature Extraction Framework for Handwritten Numeric Fields recongnition", IEEE Proceedings on Patter Recognition; ISBN: 0–8186–7282–X, vol. 4, pp. 436–440, Aug. 1996.*

Forman et al, "Multisensor Target Recognition System (MUSTRS)", IEEE Conference on Signals, Systems and Computers; ISBN: 0–8186–4120–7, vol. 1, pp. 263–267, Nov. 1993.*

* cited by examiner

*Primary Examiner*—Amelia M. Au
*Assistant Examiner*—Mehrdad Dastouri
(74) *Attorney, Agent, or Firm*—Leonard A. Alkov; Glenn H. Lenzen, Jr.

(57) ABSTRACT

A method and apparatus for detecting a pattern within an image. Image data (22) is received which is representative of the image. Filter values (70) are determined which substantially optimizes a first predetermined criterion (68). The first predetermined criterion (68) is based upon image data (22). A correlation output (40) is determined which is indicative of the presence of the pattern within the image data (22). The correlation output (40) is based upon the determined filter values (70) and the image data (22) via a non-linear polynomial relationship (78).

19 Claims, 3 Drawing Sheets

POLYNOMIAL FILTERS FOR HIGHER ORDER CORRELATION AND MULTI-INPUT INFORMATION FUSION

CROSS-REFERENCE TO RELATED APPLICATION

The application is based upon and claims priority to U.S. Provisional Patent Application Serial No. 60/043,408 filed Apr. 4, 1997, and entitled Polynomial Filters for Higher Order Correlation and Multi-Input Information Fusion, the specification and drawings of which are herein expressly incorporated by reference.

BACKGROUND OF THE INVENTION

1. Field of the Invention

The present invention relates generally to pattern recognition, and more particularly, to correlation filters used in pattern recognition.

2. Description of Related Art

Two-dimensional correlation techniques have used spatial filters (known as correlation filters) to detect, locate and classify targets in observed scenes. A correlation filter should attempt to yield: sharp correlation peaks for targets of interest, high discrimination against unwanted objects, excellent robustness to noise in the input scene and high tolerance to distortions in the input. A variety of filters to address these aspects and other aspects have been proposed (for example, see: B. V. K. Vijaya Kumar, "Tutorial Survey of Composite Filter Designs for Optical Correlators," *Applied Optics*, Vol. 31, pp. 4773–4801, 1992).

Linear filters known as Synthetic Discriminant Function (SDF) filters have been introduced by Hester and Casasent as well as by Caulfield and Maloney (see: C. F. Hester and D. Casasent, "Multivariant Techniques for Multiclass Pattern Recognition," *Applied Optics*, Vol. 19, pp. 1758–1761, 1980; H. J. Caulfield and W. T. Maloney, "Improved Discrimination in Optical Character Recognition," *Applied Optics*, Vol. 8, pp. 2354–2356, 1969).

Other correlation filters include the minimum squared error Synthetic Discriminant Function (MSE SDF) where the correlation filter is selected that yields the smallest average squared error between the resulting correlation outputs and a specified shape (see: B. V. K. Vijaya Kumar, A. Mahalanobis, S. Song, S. R. F. Sims and J. Epperson, "Minimum Squared Error Synthetic Discriminant Functions," *Optical Engineering*, Vol. 31, pp. 915–922, 1992).

Another filter is the maximum average correlation height (MACH) filter that determines and uses the correlation shape yielding the smallest squared error (see: A. Mahalanobis, B. V. K. Vijaya Kumar, S. R. F. Sims, J. Epperson, "Unconstrained Correlation Filters," *Applied Optics*, Vol. 33, pp. 3751–3759, 1994). However, the MACH filter and other current filters generally perform only linear operations on input image data and consequently are limited in their performance to detect patterns within the input image data. Moreover, the current approaches suffer the disadvantage of an inadequate ability to process information from multiple sensors as well as at different resolution levels.

SUMMARY OF THE INVENTION

The present invention is a method and apparatus for detecting a pattern within an image. Image data is received which is representative of the image. Filter values are determined which substantially optimize a first predetermined criterion. The first predetermined criterion is based upon the image data. A correlation output is generated using a non-linear polynomial relationship based upon the determined filter values and the image data. The correlation output is indicative of the presence of the pattern within the image data.

The present invention contains the following features (but is not limited to): improved probability of correct target recognition, clutter tolerance and reduced false alarm rates. The present invention also contains such features as (but is not limited to): detection and recognition of targets with fusion of data from multiple sensors, and the ability to combine optimum correlation filters with multi-resolution information (such as Wavelets and morphological image transforms) for enhanced performance.

Additional advantages and features of the present invention will become apparent from the subsequent description and the appended claims, taken in conjunction with the accompanying drawings in which:

DESCRIPTION OF THE PREFERRED EMBODIMENTS

Notation Format

The notation employed in the present invention is as follows: images in the space domain are denoted in lower case italics while upper case italics are used to represent the same in the frequency domain. Thus, a two dimensional (2D) image $x(m, n)$ has Fourier transform $X(k,l)$. Vectors are represented by lower case bold characters while matrices are denoted by upper case bold characters. Either $x(m,n)$ or $X(k,l)$ can be expressed as a column vector x by lexicographical scanning. The superscript $^T$ denotes the transpose operation, and + denotes the complex conjugate transpose of vectors and matrices.

Figure 1:
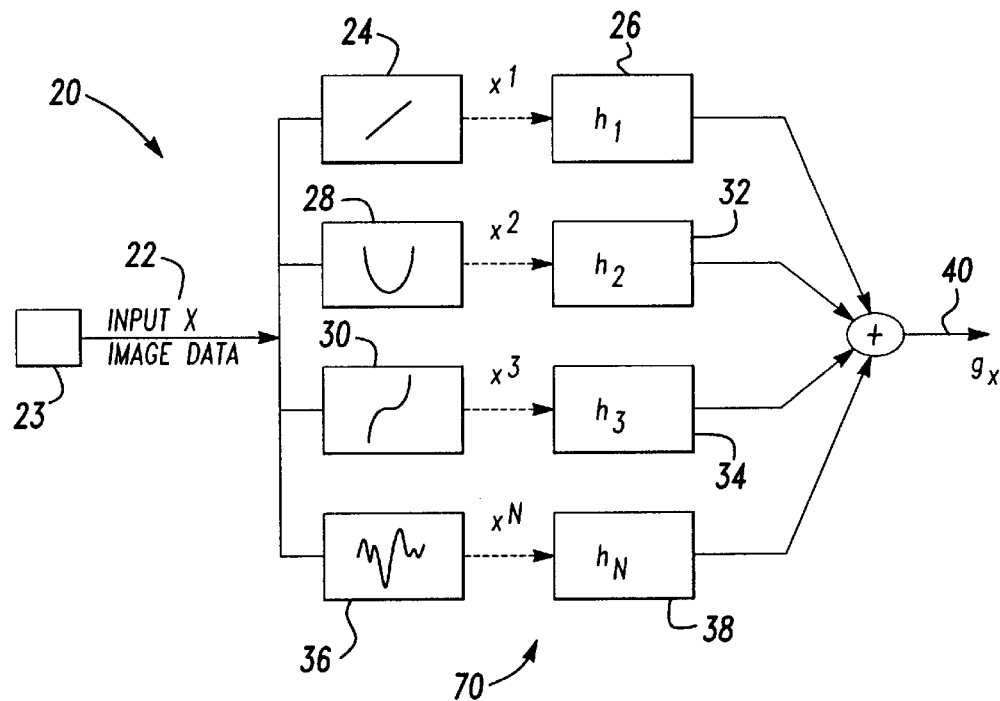
FIG. 1 is a flow diagram depicting the N-th order polynomial correlation filter.

Referring to FIG. 1, the correlation filter 20 of the present invention receives input image data 22 from input device 23 in order to detect a pattern within the image data 22. A first order term 24 of image data 22 is associated with a first filter term 26. Successive order terms (28 and 30) of image data 22 are associated with successive filter terms (32 and 34). Ultimately, the Nth order term 36 is associated with filter term $h_N$ 38.

Values for the filter terms are determined which substantially optimize a performance criterion which is based upon the image data, and a spectral quantity. The spectral quantity represents a spectral feature of the image data 22. For a description of spectral quantities and features, please see: A. Mahalanobis, B. V. K. Vijaya Kumar, and D. Casasent, "Minimum Average Correlation Energy Filters," *Applied Optics*, vol. 26, pp. 3633–3640, 1987.

A correlation output $g_x$ 40 is produced based upon the determined filter values and the image data 22 using a non-linear polynomial relationship. The non-linear polynomial relationship is a feature of the present invention over other approaches—that is, the present invention treats the output as a non-linear function of the input. In the present invention, the non-linear polynomial relationship of the output is expressed as:

$$g_x = A_1 x^1 + A_2 x^2 + \ldots + A_N x^N \tag{1}$$

where $x^i$ represents the vector x with each of its element raised to the power i, and $A_i$ is a matrix of coefficients associated with the ith term of the polynomial. It should be noted that the output $g_x$ is also a vector.

Equation (1) is termed the polynomial correlation filter (or PCF). Thus if x represents the input image in vector notation, then $g_x$ is a vector which represents the output correlation plane as a polynomial function of x. To ensure that the output is shift invariant, all the coefficient matrices are in a Toeplitz format. For a description of the Toeplitz format, see the following reference: Matrix Computations, Gene H. Golub, Charles F. Van Loan, Johns Hopkins Press, 1989. Each term in the polynomial is computed as a linear shift-invariant filtering operation:

$$A_i x^i = h_i(m, n) \oplus x^i(m, n) \tag{2}$$

or that filtering $x^i(m,n)$ by $h_i(m,n)$ is equivalent to multiplying $x^i$ by $A_i$. The symbol "$\oplus$" is used to indicate spatial filtering. The output of the polynomial correlation filter is mathematically expressed as:

$$g_x(m, n) = \sum_{i=1}^{N} h_i(m, n) \oplus x^i(m, n) \tag{3}$$

The filters $h_i(m, n)$ are determined such that the structure shown in FIG. 1 optimizes a performance criterion of choice. For the preferred embodiment, the Optimal Trade-off (OT) performance criterion is selected (for a discussion of the OT performance criterion, see Ph. Refregier, "Filter Design for Optical Pattern Recognition: Multicriteria Optimization Approach," *Optics Letters*, Vol. 15, pp. 854–856, 1990). The OT performance criterion is as expressed as:

$$J(h) = \frac{|m^+ h|^2}{h^+ B h} \tag{4}$$

where h is the filter vector in the frequency domain, B is a diagonal matrix related to a spectral quantity, and m is the mean image vector, also in the frequency domain. The following spectral quantities can be used in the OT performance criterion: average correlation energy (ACE); average similarity measure (ASM); output noise variance (ONV); or combinations of these performance criterion can be used which are all of the same quadratic form as the denominator of Eq. (4). However, it is to be understood that the present invention is not limited to only these spectral quantities, but includes those which will function for the application at hand. An alternate embodiment of the present invention includes optimizing the same class of performance criteria.

Sample Second Order Correlation Filter

By way of example, the operations involved in a second order correlation filter of the present invention is discussed herein. However, it is to be understood that the present invention is not limited to only second order correlation filters but includes any higher order correlation filter.

Accordingly in this example, the polynomial has only two terms and the output is expressed as:

$$g(m, n) = x(m, n) \oplus h_1(m, n) + x^2(m, n) \oplus h_2(m, n) \tag{5}$$

The expression for J(h) is obtained by deriving the numerator and the denominator of Eq. (4). In vector notation, the average intensity of the correlation peak for a second order filter is $$|\text{AveragePeak}|^2 = |h_1^{3o} m^1|^2 + |h_2^+ m^2|^2 \tag{6}$$

where $h_1$ and $h_2$ are vector representations of the filters associated with the first and second terms of the polynomial, and $$m^k = \frac{1}{L} \sum_{i=1}^{L} x_i^k \tag{7}$$

is the mean of the training images $x_i$, $1 \leq i \leq L$, raised to the kth power. For illustration purposes only, the denominator of the performance criterion in Eq. (4) is chosen to be the ASM metric while noting that the present invention includes any other quadratic form such as ONV or ACE or any combination thereof. The ASM for the second order non-linear filter is expressed as:

$$ASM = \frac{1}{L} \sum_{i=1}^{L} |h_1^* X_i^1 + h_2^* X_i^2 - h_1^* M^1 - h_2^* M^2|^2 \tag{8}$$

where $X_i^k$, $1 \leq i \leq L$, is the ith training image raised to the kth power expressed as a diagonal matrix, and $M^k$ is their average (also a diagonal matrix). After algebraic manipulations, the expression for ASM is:

$$ASM = h_1^+ S_{11} h_1 + h_2^+ S_{22} h_2 + h_1^+ S_{12} h_2 + h_2^+ S_{21} h_1 \tag{9}$$

where $$S_{kl} = \frac{1}{L} \sum_{i=1}^{L} X_i^k (X_i^l)^* - M^k (M^l)^*, \ 1 \leq k, \ 1 \leq 2 \tag{10}$$

are all diagonal matrices. The block vectors and matrices are expressed as:

$$h = \begin{bmatrix} h_1 \\ h_2 \end{bmatrix}, m = \begin{bmatrix} m^1 \\ m^2 \end{bmatrix}, \text{ and } S = \begin{bmatrix} S_{11} & S_{12} \\ S_{21} & S_{22} \end{bmatrix} \tag{11}$$

The expression for J(h) for the second order filter is expressed as:

$$J(h) = \frac{|\text{average peak}|^2}{ASM} \tag{12}$$

$$= \frac{|h_1^+ m^1|^2 + |h_2^+ m^2|^2}{h_1^+ S_{11} h_1 + h_2^+ S_{22} h_2 + h_1^+ S_{12} h_2 + h_2^+ S_{21} h_1}$$

$$= \frac{|m^+ h|^2}{h^+ S h}$$

The following equation maximizes J(h):

$$h = S^{-1} m \quad (13)$$

Using the definitions in Eq.(11), the solution for the two filters of the second order polynomial is:

$$\begin{bmatrix} h_1 \\ h_2 \end{bmatrix} = \begin{bmatrix} S_{11} & S_{12} \\ S_{21} & S_{11} \end{bmatrix}^{-1} \begin{bmatrix} m^1 \\ m^2 \end{bmatrix} \quad (14)$$

The inverse of the block matrix is expressed as:

$$\begin{bmatrix} h_1 \\ h_2 \end{bmatrix} = \begin{bmatrix} \dfrac{S_{12}m^2 - S_{22}m^1}{|S_{12}|^2 - S_{11}S_{22}} \\ \dfrac{S_{21}m^1 - S_{11}m^2}{|S_{12}|^2 - S_{11}S_{22}} \end{bmatrix} \quad (15)$$

The solution in Eq. (14) is extended to the general Nth order case. Following the same analysis as for the second order case, the N-th order solution is expressed as:

$$\begin{bmatrix} h_1 \\ h_2 \\ \vdots \\ h_N \end{bmatrix} = \begin{bmatrix} S_{11} & S_{12} & \cdots & S_{1N} \\ S_{21} & S_{22} & \cdots & S_{2N} \\ \vdots & \vdots & \ddots & \vdots \\ S_{N1} & S_{N2} & \cdots & S_{NN} \end{bmatrix}^{-1} \begin{bmatrix} m^1 \\ m^2 \\ \vdots \\ m^N \end{bmatrix} \quad (16)$$

The block matrix to be inverted in Eq. (16) can be quite large depending on the size of the images. However, because all $S_{k1}$ are diagonal and $S_{k1} = (S_{1k})^*$, the inverse can be efficiently computed using a recursive formula for inverting block matrices.

The present invention is not limited to only a power series representation of the polynomial correlation filter as used for deriving the solution in Eq. (16). The analysis and the form of the solution remain substantially the same irrespective of the non-linearities used to obtain the terms of the polynomial. Thus, the correlation output is generally expressed as:

$$g_N = \sum_{i=1}^{N} A_i f_i(x) \quad (17)$$

where f(.) is any non-linear function of x. For example, possible choices for the non-linearities include absolute magnitude and sigmoid functions. The selection of the proper non-linear terms depends on the specific application of the correlation filter of the present invention. For example, it may be detrimental to use logarithms when bipolar noise is present since the logarithm of a negative number is not defined.

Figure 2A:
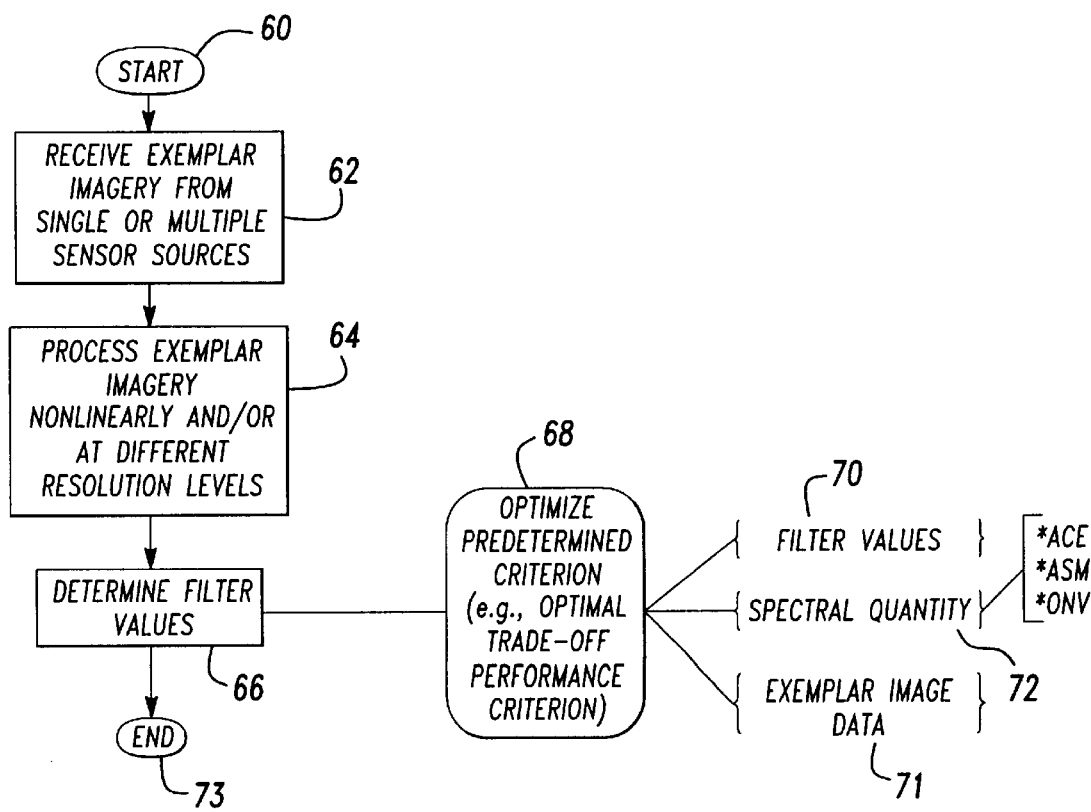
FIGS. 2a–2b are flow charts depicting the operations involved for the correlation filter.

FIG. 2a depicts the sequence of operations for the correlation filter of the present invention to determine the filter values. The preferred embodiment performs these operations "off-line."

Start indication block 60 indicates that block 62 is to be executed first. Block 62 receives the exemplar image data from single or multiple sensor sources. Block 64 processes the exemplar image data nonlinearly and/or at different resolution levels. Processing the data nonlinearly refers to the calculation of the "f(.)" terms of equation 17 above.

Block 64 may use Wavelets and morphological image transforms in order to process information at different resolution levels. For a description of Wavelets and morphological image transforms, see the following reference: "Morphological Methods in Image and Signal Processing," Giardine and Dougherty, Prentice Hall, Englewood Cliffs, 1988; and C. K. Chui, "An Introduction to Wavelets" Academic Press, New York, 1992.

Block 66 determines the filter values through execution of the subfunction optimizer block 68. The subfunction optimizer block 68 determines the filter values which substantially optimize a predetermined criterion (such as the Optimal trade-off performance criterion). The function of the predetermined criterion interrelates filter values 70, exemplar image data 71 and a spectral quantity 72 (such as average correlation energy (ACE), average similarity measure (ASM), output noise variance (ONV), and combinations thereof). Processing for determining the filter values terminates at termination block 73.

Figure 2B:
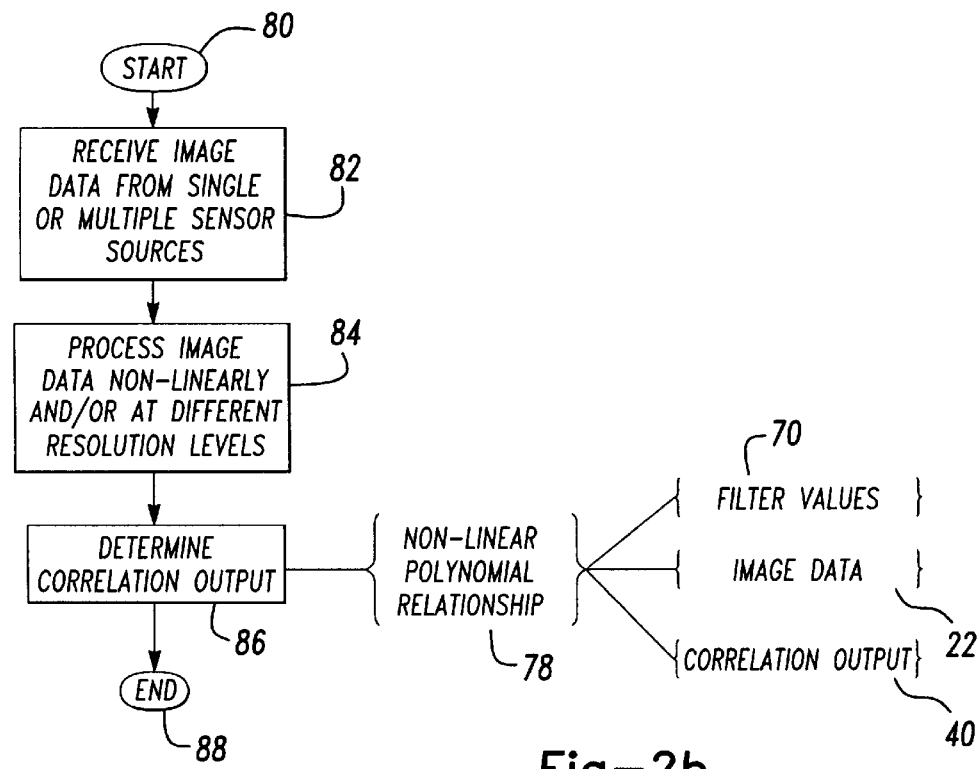

FIG. 2b depicts the operational steps for determining correlation outputs based upon the filter values. The preferred embodiment performs these operations "on-line."

Start indication block 80 indicates that block 82 is to be executed first. Block 82 receives image data from single or multiple sensor sources. Block 84 processes the image data non-linearly and/or at different resolution levels. Processing the data nonlinearly refers to the calculation of the "f(.)" terms of equation 17 above.

Block 86 determines the correlation output 40. The correlation output 40 is indicative of the presence of the pattern within the image data 22. A non-linear polynomial relationship 78 interrelates the correlation output 40, the determined filter values 70, and the image data 22. Processing terminates at termination block 88.

As discussed in connection to FIG. 2b, the present invention can be used to simultaneously correlate data from different image sensors. In this case, the sensor imaging process and its transfer function itself are viewed as the non-linear mapping function. The different terms of the polynomial do not have to be from the same sensor or versions of the same data.

Figure 3:
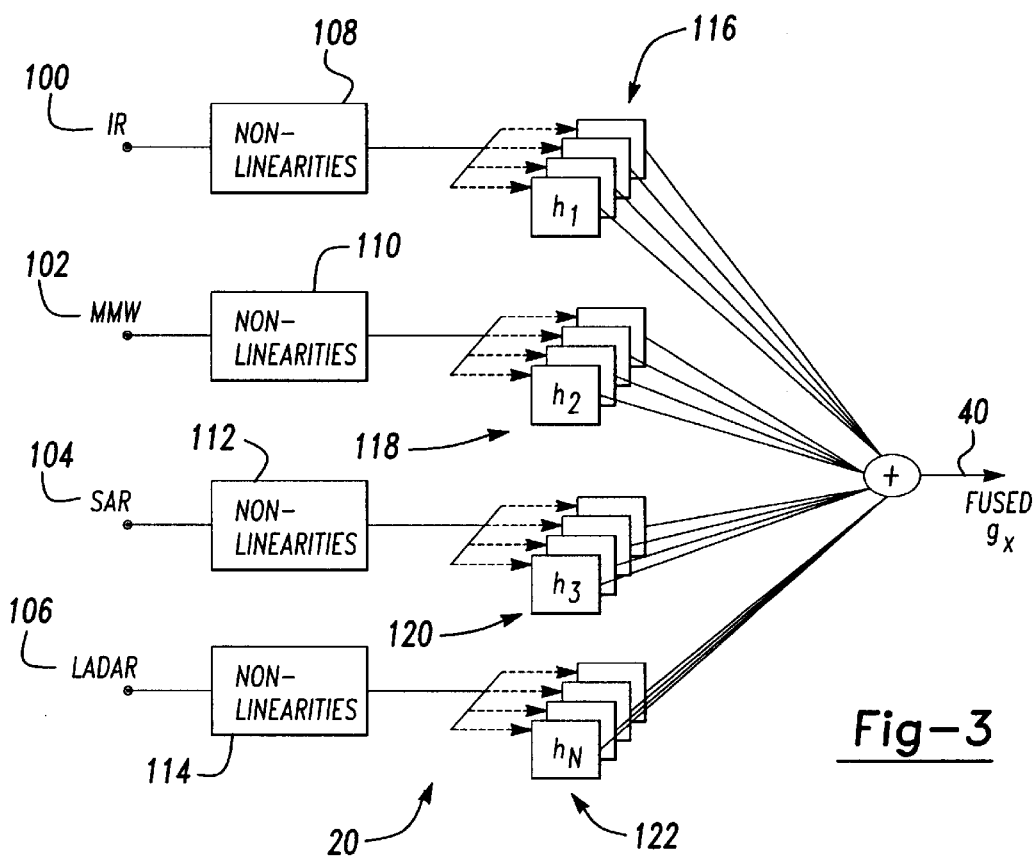
FIG. 3 is a flow diagram depicting the N-th order polynomial correlation filter for multi-sensor fusion.

FIG. 3 depicts input image data from different sensors which is directly injected into the correlation filter 20 of the present invention resulting in a fused correlation output 40. For example, image sensor 100 is an Infrared (IR) sensor; image sensor 102 is a Laser Radar (LADAR) sensor; image sensor 104 is a Synthetic Aperture Radar (SAR) sensor; and image sensor 106 is millimeter wave (MMW) sensor.

The analysis and the form of the solution remain the same as that in Eq. (16). Accordingly, each image sensor (100, 102, 104, and 106) has their individual input image data fed into their respective non-linear polynomial relationship (108, 110, 112, and 114). Each non-linear polynomial relationship (108, 110, 112, and 114) depicts a pixel by pixel nonlinear operation on the data.

Each image sensor (100, 102, 104, and 106) has their respective filter terms (116, 118, 120, and 122) determined in accordance to the optimization principles described above. The determined filter values are then used along with the input image data to produce a fused correlation output 40.

Moreover, FIG. 3 depicts the present invention's extension to multi-sensor and multi-resolution inputs. In other words, the terms of the polynomial are the multi-spectral data represented at different resolutions levels, as for example to achieve correlation in Wavelet type transform domains. Wavelet type transform domains are described in the following reference: C. K. Chui, "An Introduction to Wavelets" Academic Press, New York, 1992.

EXAMPLE

Figure 4:
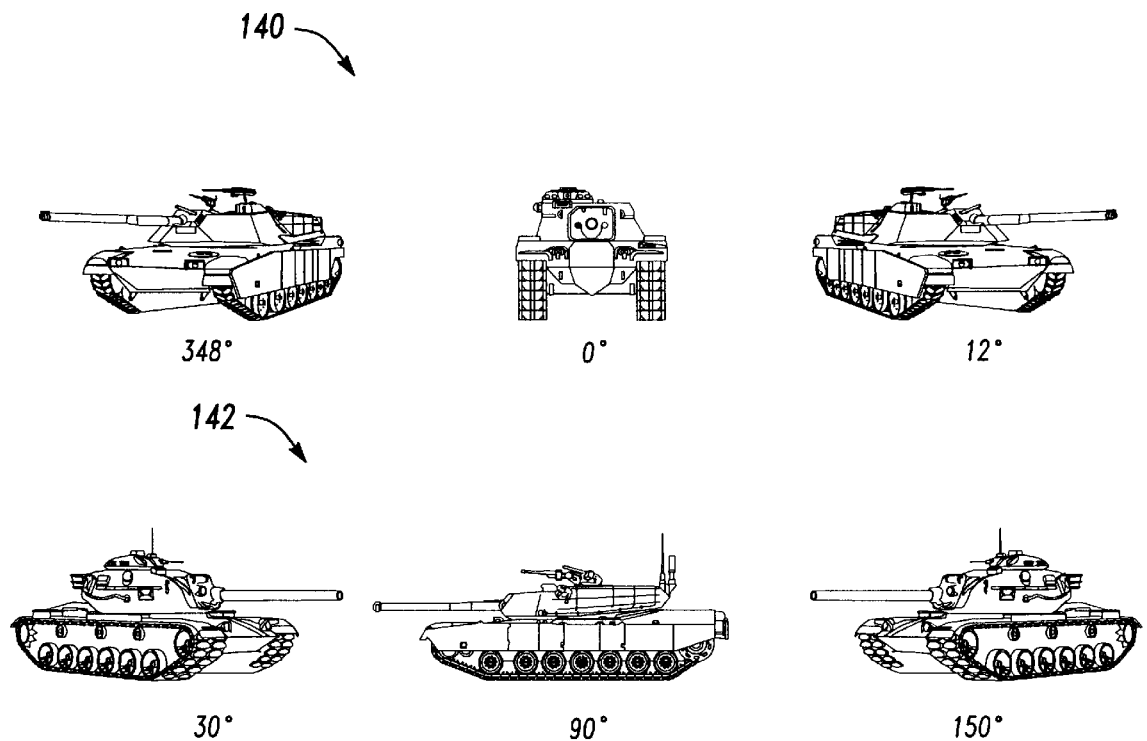
FIG. 4 are perspective views of sample tanks at different angles of perspective.

Sample images of a tank from a database are shown in FIG. 4. The images were available at intervals of three degrees in azimuth. The end views of the tank are generally depicted at 140. The broadside views of the tank are generally depicted at 142.

The sample images were used for training and testing a conventional linear MACH filter versus a fourth order (N=4) PCF. The peak-to-sidelobe ratio (PSR) of the correlation peaks defined as $$PSR = \frac{p - \text{mean}}{\text{standard deviation}} = \frac{p - \mu}{\sigma} \quad (18)$$

was computed and used for evaluating the performance of the filters. In each case, Gaussian white noise was added to the test images to simulate a per pixel signal to noise ratio (SNR) of 10dB.

Figure 5:
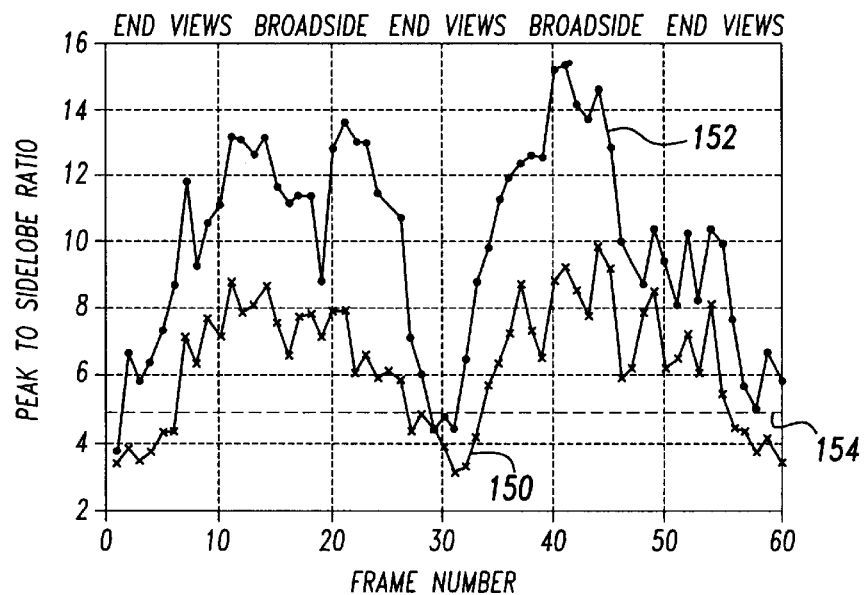
FIG. 5 is a graph depicting peak-to-sidelobe ratio versus frame number.

The PSR outputs of the conventional linear MACH filter 150 and the 4th order MACH PCF 152 are shown in FIG. 5 for comparison. FIG. 5 shows the behavior of PSR over the range of aspect angles. While the PSR is fundamentally low at end views (where there are fewer pixels on the target), the PSR output of the MACH PCF is always higher than its linear counterpart.

A detection threshold 154 is used to determine if the tank pattern has been detected within the image frame number. As seen from FIG. 5, the 4th order MACH PCF missed fewer detections of the pattern than the conventional linear MACH filter.

The embodiments which have been set forth above for the purpose of illustration were not intended to limit the invention. It will be appreciated by those skilled in the art that various changes and modifications may be made to the embodiments discussed in the specification without departing from the spirit and scope of the invention as defined by the appended claims.

What is claimed is:

1. A method for detecting a pattern within an image comprising the steps of:
   (a) receiving image data which is representative of said image;
   (b) determining correlation filter values that substantially optimize a first predetermined criterion, said first predetermined criterion being based upon said image data and a spectral quantity, wherein said spectral quantity relates to the combination of average correlation energy, and average similarity measure, and output noise variance; and
   (c) generating a correlation filter output as a non-linear relationship based upon said determined filter values and said image data, said correlation output being used for detecting the presence of said pattern within said image data.

2. The method of claim 1 wherein said non-linear relationship is a non-linear polynomial relationship that is:

$$g_x = A_1 x^1 + A_2 x^2 + \ldots + A_N x^N$$

wherein g is representative of said correlation output, wherein x is representative of said image data, wherein A is based upon said filter values.

3. The method of claim 2 wherein said non-linear polynomial relationship includes:

$$A_i x^i = h_i(m, n) \oplus x^i(m, n)$$

wherein h is representative of said filter values.

4. The method of claim 1 further comprising the steps of:
   receiving a first set of image data from a first image sensing source; and
   receiving a second set of image data from a second image sensing source;
   wherein said first and second sets of image data are representative of different physical characteristics of said image.

5. The method of claim 4 wherein said correlation output is a fused correlation vector indicative of the presence of the pattern within said first and second image data.

6. The method of claim 1 wherein said correlation output is a single correlation vector indicative of the presence of the pattern within said image data.

7. The method of claim 1 wherein said correlation output is a single correlation vector which contains the degree of correlation between said pattern being found within said image data.

8. The method of claim 1 further comprising the steps of:
   generating first and second order terms from said image data;
   generating first and second filter terms based on said correlation filter values;
   associating said first order term of the image data with said first filter term;
   associating said second order term of the image data with said second filter term; and
   generating the correlation filter output based upon the associated first filter term and upon the associated second filter term; and
   detecting said pattern within said image data when said correlation output exceeds a predetermined detection threshold.

9. The method of claim 1 wherein said image data is converted from the spatial domain into the frequency domain, wherein said correlation output is shift invariant with respect to image location.

10. The method of claim 9 wherein said image data and said filter values are contained in coefficient matrices, said coefficient matrices being in a Toeplitz format thereby making said correlation output shift invariant.

11. The method of claim 1 further comprising the step of:
    performing steps (b) and (c) at a first level of image resolution with respect to said image data
    performing steps (b) and (c) at a second level of image resolution with respect to said image data.

12. The method of claim 11 further comprising the step of:
    using wavelet principles to process said image data at multiple resolution levels.

13. The method of claim 1 wherein said image is associated with at least one spectral quantity, said first predetermined criterion being based upon said image data and said spectral quantity.

14. An apparatus for detecting a pattern within an image, said image being associated with at least one spectral quantity, comprising:
    an input device for receiving image data representative of said image;
    an optimizer connected to said input device for determining filter values which substantially optimize a first predetermined criterion, said first predetermined criterion being based upon said image data and said spectral quantity wherein said spectral quantity is related to the combination of an average correlation energy, and an average similarity measure, and an output noise variance; and a correlation filter connected to said optimizer for determining a correlation output which is indicative of the presence of said pattern within said image data, said correlation filter generating said correlation output based upon said determined filter values and said image data, said correlation output having a non-linear polynomial relationship.

15. The apparatus of claim 14 wherein said non-linear polynomial relationship is:

$$g_x = A_1 x^1 + A_2 x^2 + \ldots + A_N x^N$$

wherein g is representative of said correlation output, wherein x is representative of said image data, wherein A is based upon said filter values, said non-linear polynomial relationship further including:

$$A_i x^i = h_i(m, n) \oplus x^i(m, n)$$

wherein h is representative of said filter values.

16. The apparatus of claim 14 wherein said input device is configured to receive a first set of image data from a first image sensing source and to receive a second set of image data from a second image sensing source, wherein said first and second sets of image data are representative of different physical characteristics of said image, said image data is processed at a first and second level of resolution.

17. The apparatus of claim 14 wherein said correlation output is a single correlation vector indicative of the presence of the pattern within said image data.

18. The apparatus of claim 14 wherein said image data and said filter values and said spectral quantity are contained in coefficient matrices, said coefficient matrices being in a Toeplitz format thereby making said correlation output shift invariant.

19. A method for detecting a pattern within an image comprising the steps of:

(a) receiving image data which is representative of said image;

(b) determining filter values which substantially optimize a first predetermined criterion, said first predetermined criterion being based upon said image data; and (c) using a non-linear polynomial relationship to generate a correlation output based upon said determined filter values and said image data, said correlation output being indicative of the presence of said pattern within said image data, wherein said first predetermined criterion is an optimal trade-off performance criterion, said spectral quantity is related to the combination of average correlation energy, and average similarity measure, and output noise variance.

* * * * *